United States Patent
Phelan et al.

(10) Patent No.: US 6,688,851 B2
(45) Date of Patent: Feb. 10, 2004

(54) OIL PUMP FOR CONTROLLING PLANETARY SYSTEM TORQUE

(75) Inventors: Perry Edward Phelan, Harsens Island, MI (US); Joseph Palazzolo, Livonia, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 7 days.

(21) Appl. No.: 10/040,848

(22) Filed: Dec. 28, 2001

(65) Prior Publication Data

US 2003/0123998 A1 Jul. 3, 2003

(51) Int. Cl.[7] ............................................. F04B 49/00
(52) U.S. Cl. ..................... 417/212; 417/213; 417/278; 475/91
(58) Field of Search ................. 417/212, 213, 417/278, 410.4; 475/91, 114, 83

(56) References Cited

U.S. PATENT DOCUMENTS

| | | | |
|---|---|---|---|
| 2,380,783 A | | 7/1945 | Painter |
| 2,444,165 A | | 6/1948 | Lauck |
| 2,485,503 A | * | 10/1949 | Misch .................. 417/212 |
| 2,642,001 A | | 6/1953 | Dale et al. |
| 2,733,660 A | * | 2/1956 | Towle .................. 417/212 |
| 2,781,727 A | * | 2/1957 | Marshall ............... 417/212 |
| 2,821,140 A | | 1/1958 | Pettibone |
| 3,299,824 A | | 1/1967 | Gauthier |
| 4,073,605 A | | 2/1978 | Wakeman et al. |
| 4,253,803 A | | 3/1981 | Wormmeester et al. |
| 4,540,347 A | | 9/1985 | Child |
| 4,854,410 A | * | 8/1989 | Kanazawa et al. .......... 180/415 |
| 5,017,101 A | | 5/1991 | White |
| 5,085,187 A | | 2/1992 | Black |
| 5,395,217 A | | 3/1995 | Hoffmann et al. |
| 5,807,090 A | | 9/1998 | Agner |
| 5,918,573 A | * | 7/1999 | Killion ................. 417/286 |
| 5,941,788 A | | 8/1999 | Shaffer et al. |
| 6,109,615 A | | 8/2000 | Gildea et al. |
| 6,174,151 B1 | * | 1/2001 | Yarr .................... 418/171 |
| 6,227,998 B1 | * | 5/2001 | Iwao et al. .............. 477/79 |

FOREIGN PATENT DOCUMENTS

| | | | | |
|---|---|---|---|---|
| EP | 0886083 A2 | | 12/1998 | |
| JP | 61004872 A | * | 1/1986 | ........... 417/410.4 |

* cited by examiner

Primary Examiner—Cheryl J. Tyler
(74) Attorney, Agent, or Firm—Brinks Hofer Gilson & Lione

(57) ABSTRACT

This invention provides the use of a pump to regulate torque in a planetary gear system. The pump is provided with a moveable piston as an end plate. An actuator, attached to the piston, controls the movement of the piston. In one position, the piston is in contact with the internal components of the pump. When the actuator moves the piston, the piston loses contact with the pump, thus allowing a free flow of fluid between the inlet and outlet of the pump. In this configuration, the pump is no longer able to generate the pressure that creates torque in the planetary gear system.

22 Claims, 7 Drawing Sheets

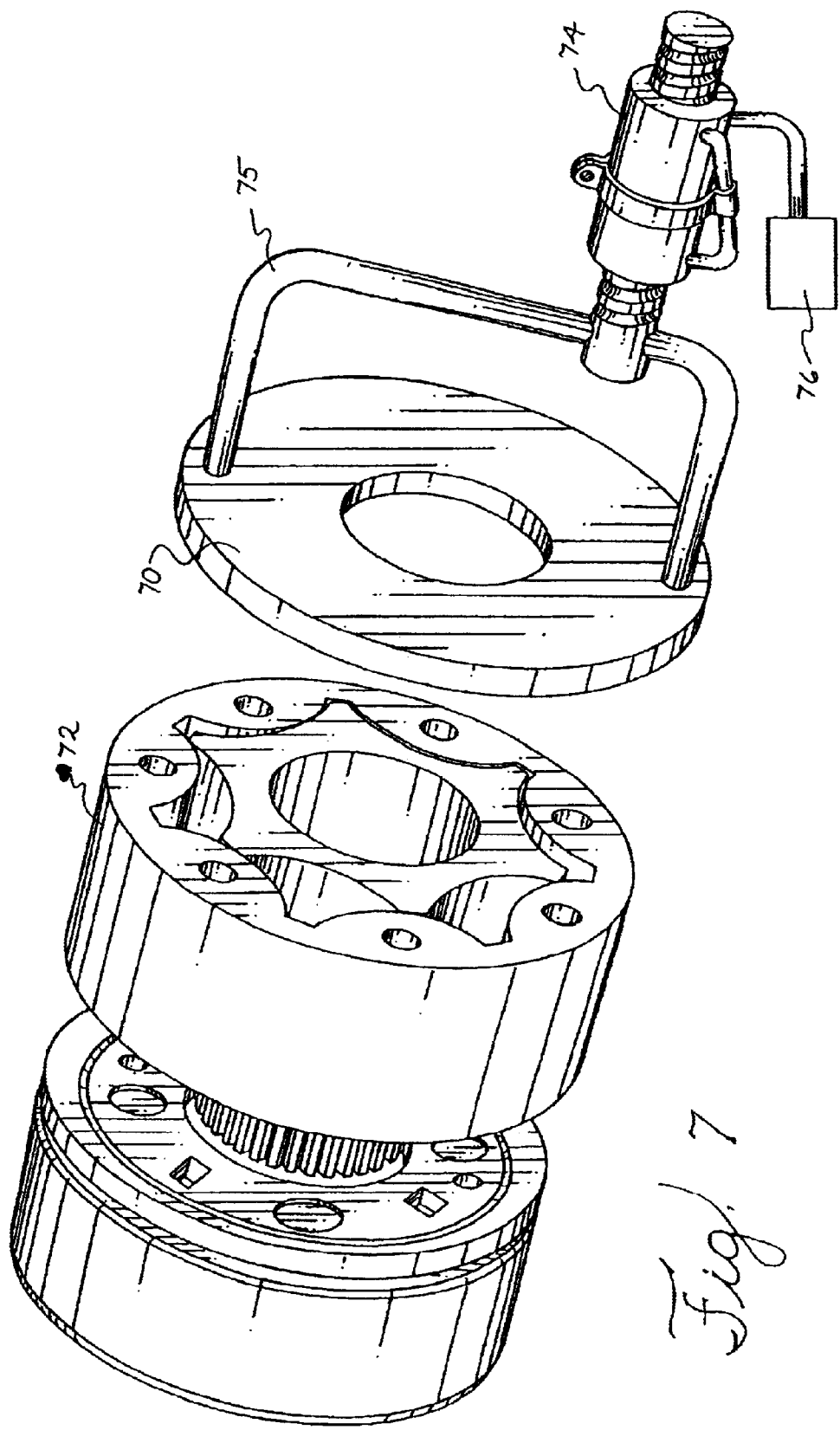

OIL PUMP FOR CONTROLLING PLANETARY SYSTEM TORQUE

FIELD OF THE INVENTION

This invention relates to a system for controlling torque through a planetary gear system. More specifically, the invention relates to the use of an oil pump combined with a planetary gear system to control the input and output torques of the system.

BACKGROUND OF THE INVENTION

In all-wheel drive or four-wheel drive vehicles, one set of wheels is directly connected to the power source through a transmission, an axle, and a series of shafts. The other set of wheels can be connected to the power source through a center differential, a coupling, or an active clutch. Typically, the function of the center differential is to regulate the proportion of power that is transmitted between the front and rear sets of wheels, thereby controlling vehicle traction and cornering characteristics.

Brakes, motors, and electric generators have been combined with planetary and differential systems to control wheel torque in automobiles. Many current systems regulate torque transfer by controlling the drag between plates in a fluid-filled clutch. The use of a clutch to transfer torque is expensive to implement, however, and the operation of the clutch generates a high amount of friction that dissipates a substantial amount of the torque being transferred.

SUMMARY

The invention provides a more efficient and less expensive system to control torque. This is accomplished with a pump combined with a planetary gear system. The pump comprises an inlet port and an outlet port for a fluid, a cover member, and a piston, which acts as the end member of the pump. An actuator is attached to the piston. The actuator moves the piston between a first and second position relative to the pump. A controller is coupled to the actuator. The controller positions the actuator in response to control signals.

Another embodiment of this invention is a method of regulating torque in a planetary gear system. First, pump pressure is increased by sealing a pump with a reciprocable piston via an actuator. Torque is then transferred through a planetary system by a sun gear coupled to the pump. The torque can then be controlled by positioning the reciprocable piston with an actuator.

Other systems, methods, features, and advantages of the invention will become apparent to one skilled in the art upon examination of the following figures and detailed description. All such additional systems, methods, features, and advantages are intended to be included within this description, within the scope of the invention, and protected by the accompanying claims.

BRIEF DESCRIPTION OF THE FIGURES

The invention may be better understood with reference to the following figures and detailed description. The components in the figures are not necessarily to scale, emphasis being placed upon illustrating the principles of the invention.

FIG. 7 represents an illustration of the embodiment of FIG. 3 with a ballscrew.

DETAILED DESCRIPTION OF THE PREFERRED EMBODIMENTS

Figure 1A:
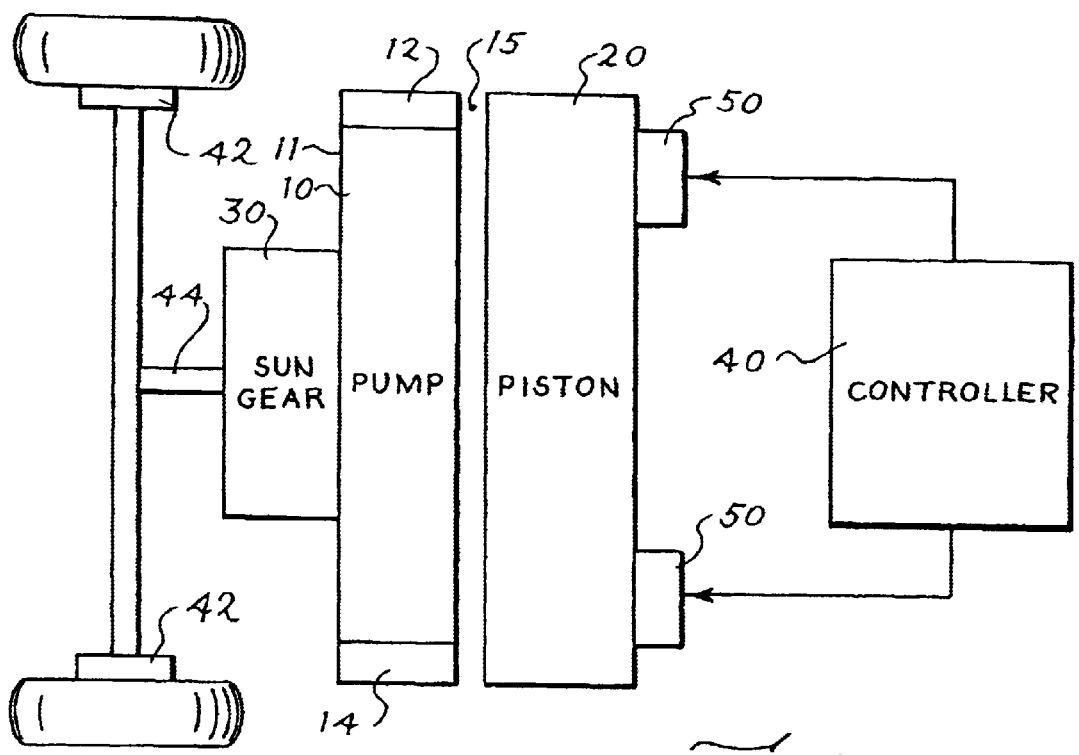
FIGS. 1A and 1B represent a pump adjacent to a planetary gear system to control torque in the gear system according to the present invention.
Figure 1B:
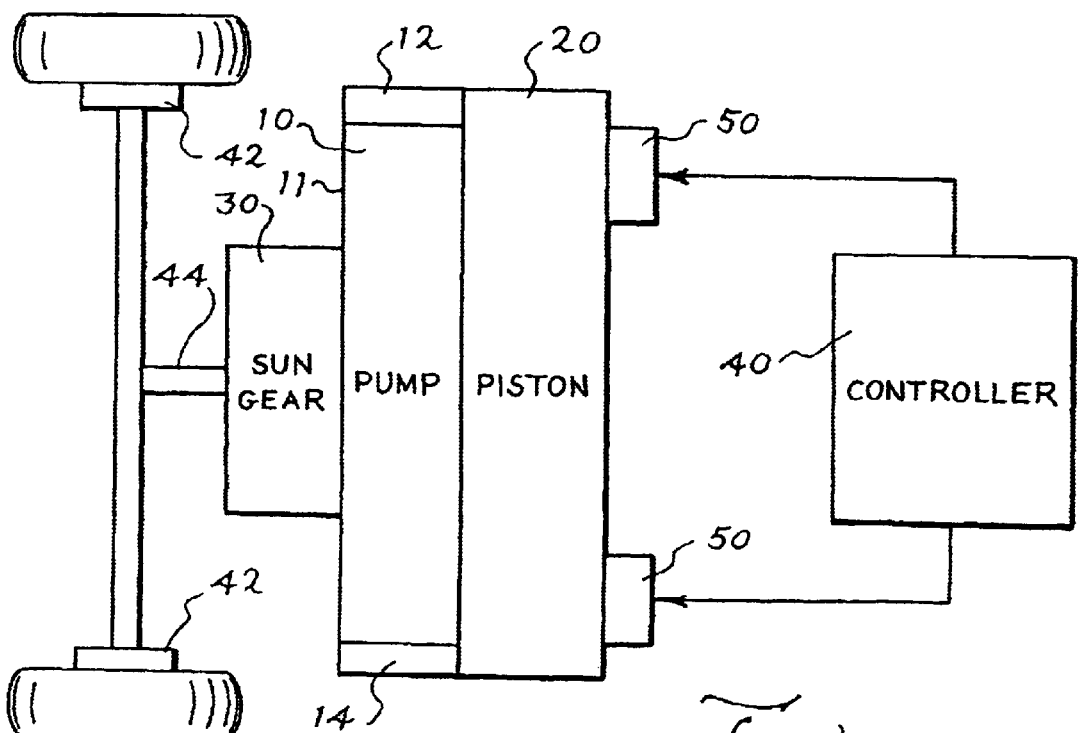

FIGS. 1A and 1B are diagrams illustrating a pump 10 having an actuator 50 adjacent to a planetary gear system for controlling the transfer of torque through the system. In the preferred embodiment of the invention, the pump 10 is a gerotor oil pump. Alternative pump types may be used. For example, the pump 10 may be a gear pump, a crescent pump, or a vane pump. The pump 10 further contains an inlet port 12 for fluid to enter the pump 10 and an outlet port 14 for fluid to exit the pump 10.

According to the present invention, the pump 10 is preferably configured with a cover member 11 and a piston 20 acting as an end member. During normal operating conditions of the pump 10, the piston 20 is positioned away from the internal components of the pump 10, as shown in FIG. 1A. This configuration allows fluid to enter the inlet port 12, circulate through the pump 10, and exit the outlet port 14 and immediately re-enter the inlet port 12. In this first position of the piston 20, no pressure is generated within the pump 10.

When pressure is required from the pump 10, the piston 20 is moved into close contact with the pump 10, as shown in FIG. 1B. In this second position, the piston 20 forms a seal with the pump, confining the fluid outlet to create pressure. The restricted fluid flow generates a rapid pressure increase within the pump 10. The movement of the piston 20 between the first and second position illustrates the reciprocable nature of the piston 20.

The pump 10 is coupled to a sun gear 30 of a planetary gear system. In an alternative embodiment of the invention, the sun gear 30 may be attached to the outer rotor of the pump 10. In another embodiment of the invention, the sun gear and the planetary gear system is further coupled to an output shaft 44. The pressure within the pump 10 increases as the fluid flow is restricted, and a gradual braking force is applied to the sun gear 30. This creates a speed differential between the sun gear 30 and the planetary gear system, which results in a transfer of torque through the planetary gear system. The amount of torque generated by the pump 10 is a direct function of the pump pressure, and can be found through the following formula:

$$T = D*(P/2*\pi)$$

where T is torque, D is the volume of fluid displaced by the pump, and P is pressure. The amount of torque transferred through the planetary system is directly related to the degree to which the pump 10 applies a braking force to the sun gear 30, which is in turn directly related to the degree to which fluid flow is restricted through the outlet port 14 of pump 10.

An actuator 50 is coupled to the piston 20. The actuator 50 operates to adjust the position of the piston 20 relative to the pump. In a preferred embodiment of the invention, the actuator 50 is a spring plate containing a plurality of springs attached to the piston 20. In a first alternative embodiment, the actuator 50 may be a solenoid. In another alternative embodiment, the actuator 50 may be a ball screw. Other structural substitutes are possible.

A controller 40 controls the position of the piston 20. The controller 40 may be implemented as hardware, software, or a combination of both. In a preferred embodiment, the controller 40 is an automobile computer control system. In another embodiment, the controller 40 may be a microcomputer comprising a microprocessor, input/output devices, interface components, and memory. In another embodiment, the controller 40 may be a digital signal processor.

The controller 40 is equipped with the capability to receive input control signals as well as transmit control output signals. In a preferred embodiment, the controller receives input signals from sensors 42 located near all four wheels of the automobile. One set of sensors measure the speed of each wheel while the automobile is in motion. Other sensors may detect when a braking force is applied to each wheel. These sensors transmit output signals that correspond to the measured wheel speeds and the amount of braking force on each wheel to the controller 40. Additionally, the controller 40 receives input signals from sensors that measure responses to driver input. These sensors perform calculations in response to conditions such as braking, wheel slip, yaw, oversteer, and understeer. Signals that correspond to these inputs are also transmitted to the controller 40.

Once these input signals reach the controller 40, the controller 40 performs a series of calculations. The controller 40 is programmed to output various control signals based on the performed calculations. For example, the controller 40 may determine that torque is no longer required in the planetary system. The controller 40 signals the piston 20 to position itself away from the pump 10. In response, the pump rapidly loses pressure and the planetary system loses torque.

Conditions may arise when the transfer of torque is no longer required through the planetary gear system. In a preferred embodiment, the controller 40 performs a calculation in response to conditions, such as poor vehicle traction, understeer, or oversteer, under which the pump 10 should not generate torque. The controller 40 then sends an output signal to the actuator 50. The actuator 50 moves in response to the output signal, which in turn causes movement of the piston 20. In a preferred embodiment as shown in FIG. 1B, the actuator 50 moves the piston 20 to create a seal with the pump 10 to contain the flow of fluid within the pump 10. When the controller 40 requires no transfer of torque, the actuator 50 will move in an opposite direction. As shown in FIG. 1A, the piston 20 shifts to a position where it loses physical contact with the pump 10, resulting in a gap 15 between the internal structure of the pump 10 and the piston 20. In a preferred embodiment of the invention, the gap 15 will range in size from ⅜ to ½ inch. Within the gap 15, the fluid idles and is not pumped in or out of the pump 10 due to a loss of pressure within the pump housing. The pump 10 therefore creates no output pressure. The creation of the gap 15 between the pump 10 and piston 20 rapidly eliminates any torque influence the pump 10 has on the planetary system through the sun gear 30. In an alternative embodiment where the actuator 50 may be a solenoid, the actuator linearly displaces the piston 20 to create the gap 15 between the pump 10 and the piston 20.

As the operating conditions of the system change, the controller 40 may receive signals from various outlying vehicle sensors 42 and determine that torque is required in the planetary gear system. The controller 40 in such a situation sends an output signal to the actuator 50. In a preferred embodiment, the actuator 50 will rapidly position the piston 20 in response to the output signal. If torque is required, the piston 20 regains contact with the internal structure of pump 10, closing the gap that existed between the pump 10 and the piston 20 to create a seal for the pump fluid. In an alternative embodiment where the actuator 50 may be a solenoid, the actuator linearly displaces the piston 20 to close the gap between the pump 10 and the piston 20. Once this gap is closed, the pump 10 will be able to contain sufficient fluid to generate pressure in the outlet port 14. The flow of fluid within the pump 10 will enable the pump 10 to generate torque as required by the controller 40. In this embodiment of the invention, the maximum design distance separating the pump 10 and the piston 20 is ⅜ to ½ inch. This short distance allows the pump to switch from generating pressure to not generating pressure, preferably within ¹⁄₁₀ of a second.

Figure 2:
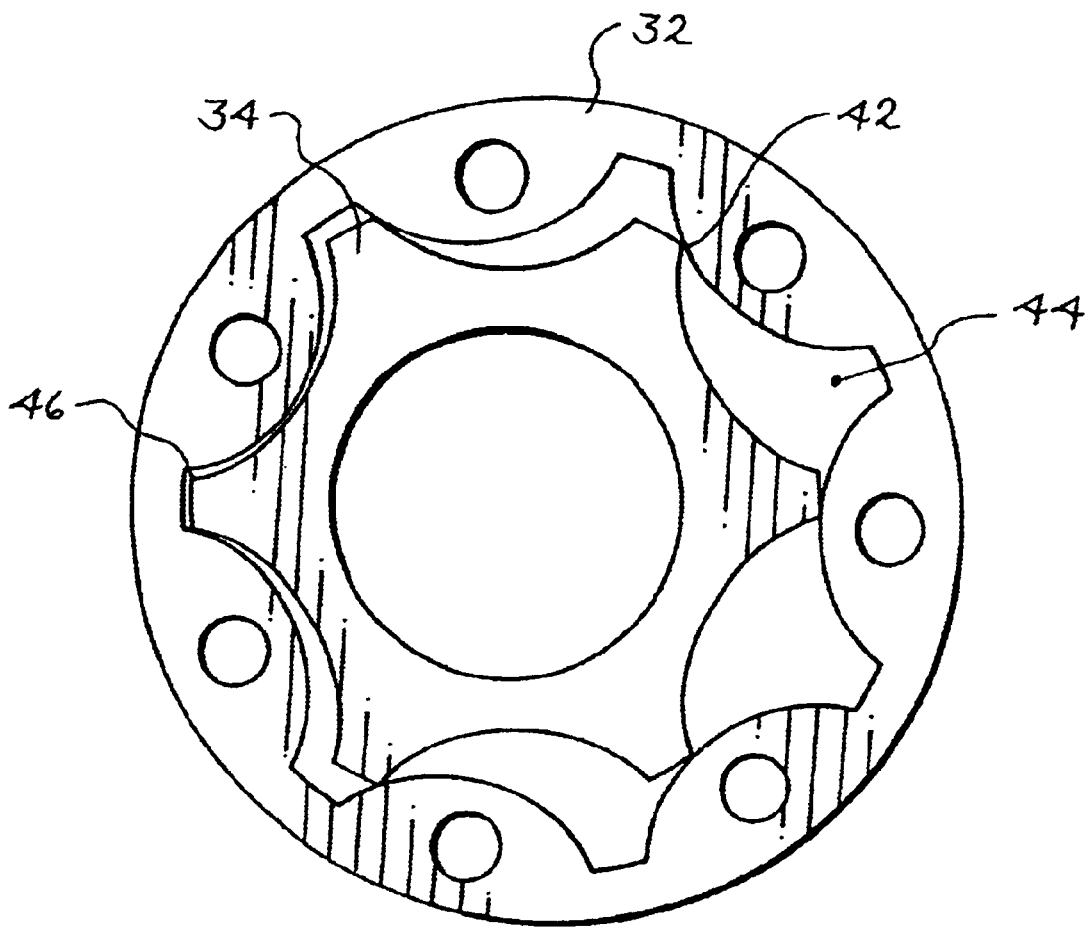
FIG. 2 represents an illustration of the rotors of a gerotor pump.

FIG. 2 is an illustration of the rotors of a gerotor pump. In a preferred embodiment of the invention, the pump includes an outer rotor 32 and an inner rotor 34. The outer rotor 32 is disposed about the inner rotor 34. In this embodiment, the outer rotor 32 is ring-shaped and provided with a plurality of evenly spaced, uniform concave ridges 42 about its inner periphery. The ridges define a plurality of valleys 44. The inner rotor 34 is ring-shaped and provided with a plurality of evenly spaced, uniform teeth 46 about its outer periphery for mating with the valleys 44 on the outer rotor 32. In a gerotor pump, there is typically one fewer tooth on the inner rotor than there are valleys in the outer rotor.

Figure 3:
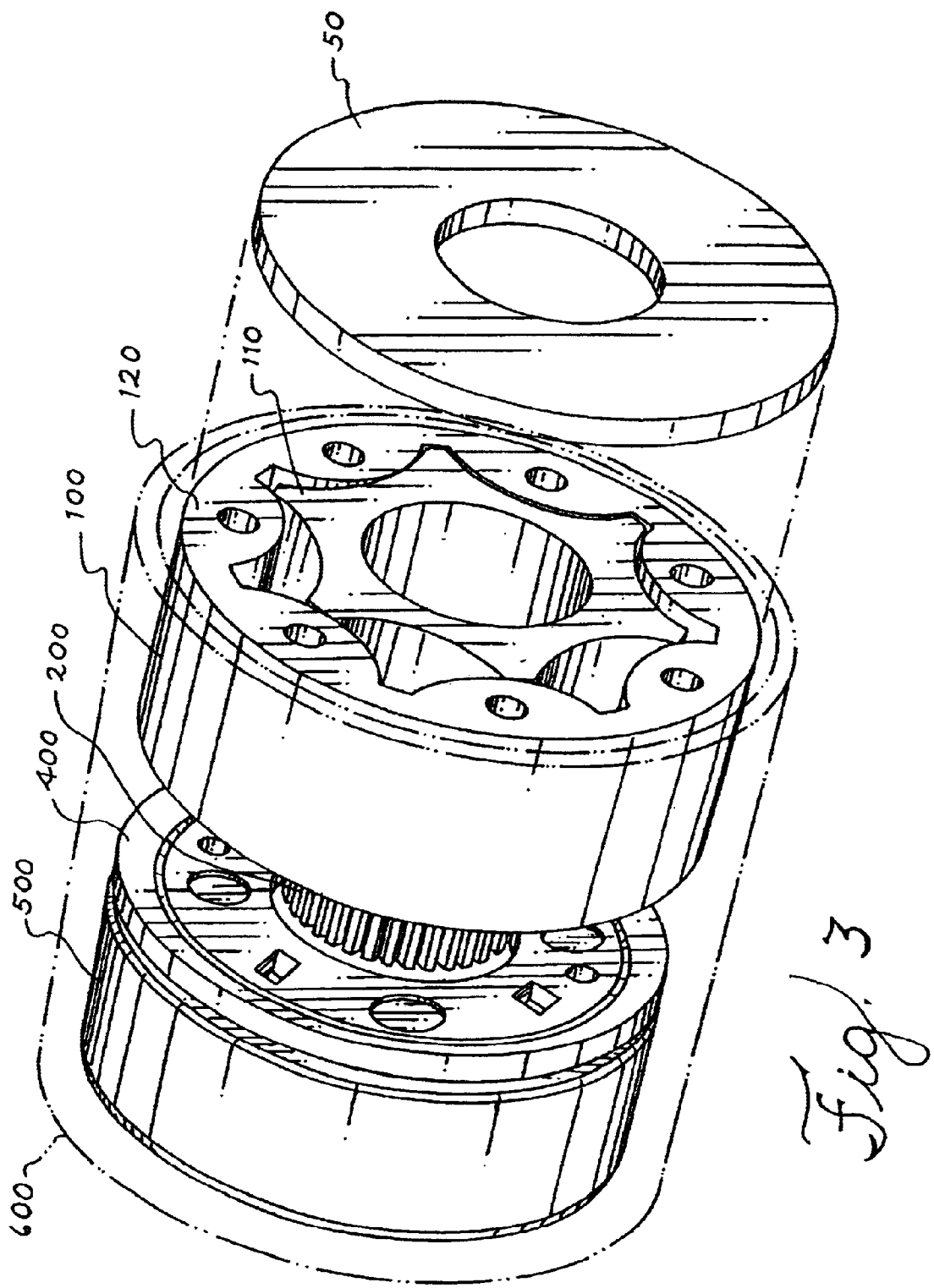
FIG. 3 represents an illustration of a gerotor pump attached to a planetary gear system.

FIG. 3 is an illustration of a gerotor pump attached to a planetary gear system. A piston 50 forms the end member of the pump 100, and is positioned so that a gap is defined between the piston 50 and the inner rotor 110 and the outer rotor 120 of the pump 100. The outer rotor 120 is attached to a sun gear 200. The sun gear 200 is coupled to a carrier plate 400 through a set of planetary gears, which are shown in detail in FIG. 4. A ring gear 500 is also attached to the planetary gears. This system is positioned within a housing 600. The housing 600 contains the pump components along with the fluid that circulates within the pump 100.

Figure 4:
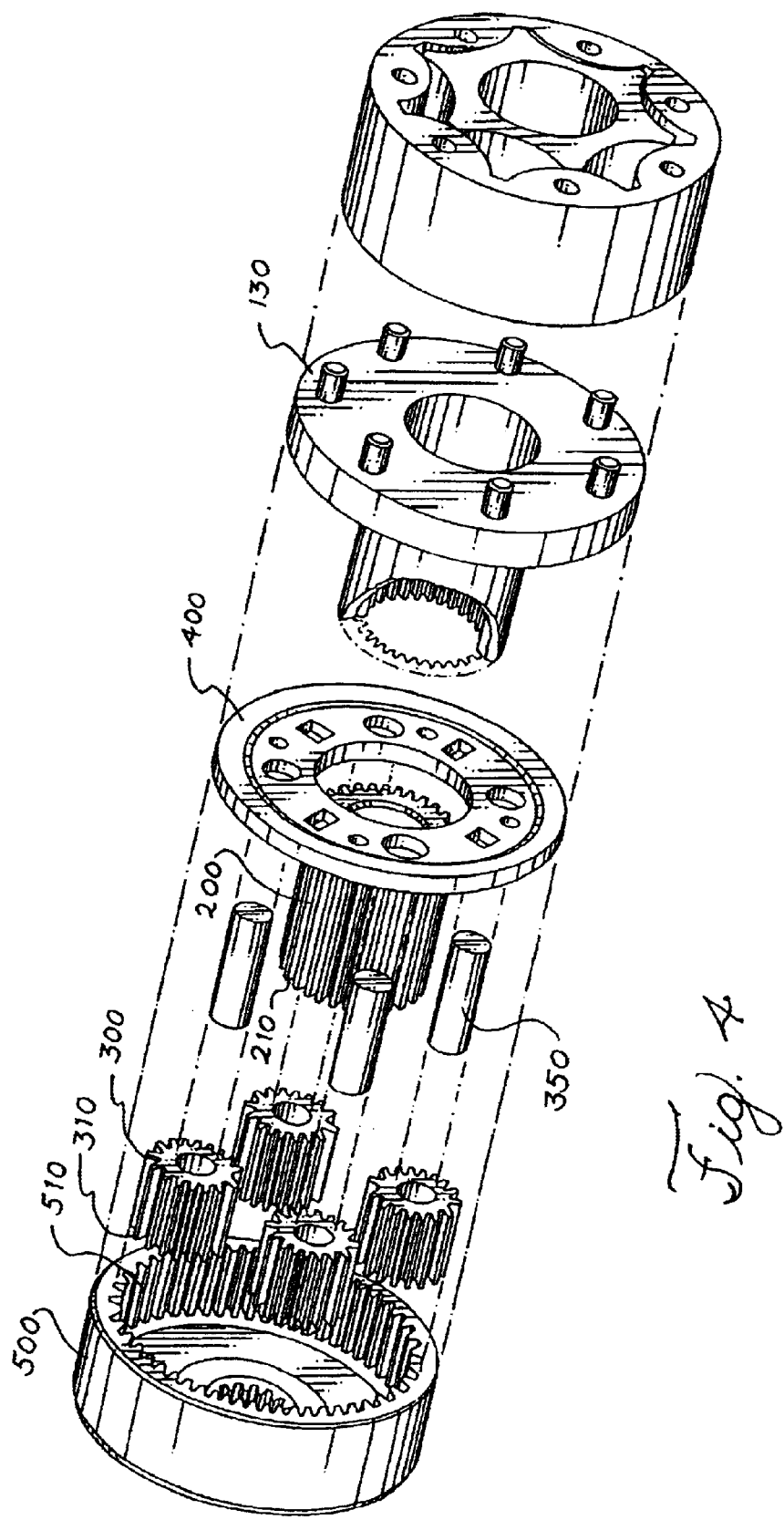
FIG. 4 represents an illustration of an exploded view of the embodiment of FIG. 3.

FIG. 4 is an exploded view of FIG. 3 that details the elements of the planetary gear system. A connecting member 130, splined on its inner periphery, meshes with the sun gear 200, which is provided with teeth 210. The planetary gears 300 are provided with teeth 310 that mesh with the sun gear 200. The planetary gears 300 are rotatably attached to the carrier plate 400 by connector pins 350. In one embodiment, four planetary gears 300 are attached to the carrier plate 400. A ring gear 500, provided with a plurality of teeth 510 disposed about its inner periphery, meshes with the planetary gears 300.

Figure 5:
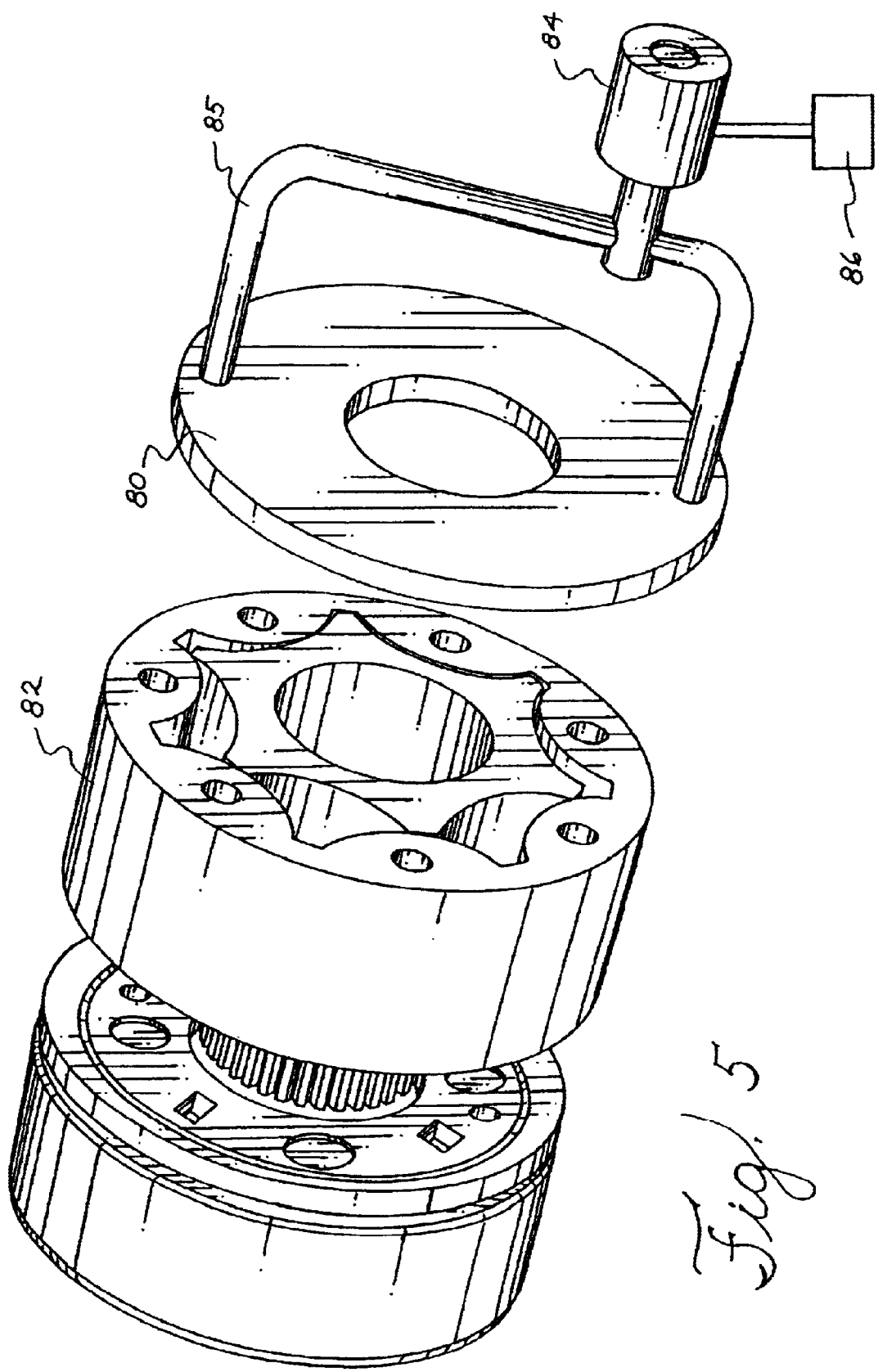
FIG. 5 represents an illustration of the embodiment of FIG. 3 with a solenoid.

FIG. 5 is an illustration of the embodiment of FIG. 3 with a solenoid 84 used to position the piston 80 with respect to the pump 82. The solenoid 84 is attached to the piston 80 by an attaching fork 85. A controller 86 is coupled with the solenoid 84. The controller 86 outputs signals to control the operation of the solenoid 84, which acts to move the piston 80 back and forth.

Under normal operating conditions, a gap is defined between the pump 82 and the piston 80. In this configuration, the pump 82 is unable to generate pressure. When the controller 86 determines that pressure is required in the pump 82, the controller 86 outputs an "on" signal to the solenoid 84. When the solenoid 84 receives the "on" signal, it drives the piston 80 forward into contact with the pump 82. The contact between the piston 80 and the pump 82 forms a seal, allowing the pump 82 to pump fluid and generate pressure.

To rapidly stop the generation of pressure in the pump 82, the controller 86 outputs an "off" signal to the solenoid 84. When the solenoid 84 receives the "off" signal, the solenoid 84 preferably reacts by driving the piston 80 in a reverse linear direction, whereby the piston 80 loses contact with the pump 82. A gap is formed between the piston 80 and the pump 82, which causes the fluid in the pump 82 to idle in the gap rather than being pumped under pressure. The use of the solenoid 84 allows for rapid movement of the piston 80.

Figure 6:
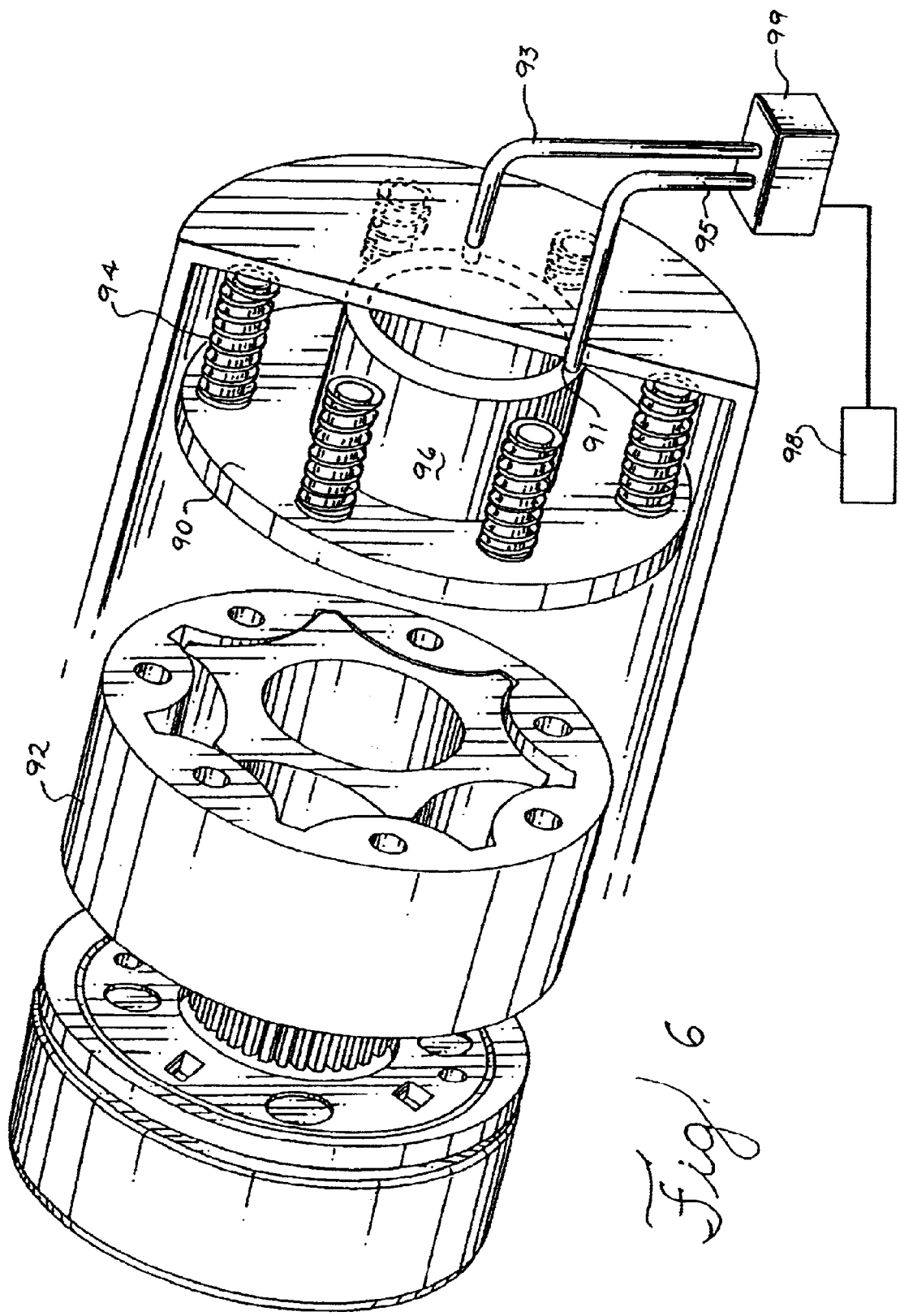
FIG. 6 represents an illustration of the embodiment of FIG. 3 with a spring plate.

FIG. 6 is an illustration of the embodiment of FIG. 3, wherein a set of springs 94 and a hydraulic chamber 96 used to position the piston 90 with respect to the pump 92. Six evenly spaced springs 94 are attached to the face of the piston 90, spaced sixty degrees apart. The springs 94 are further attached to the rear surface of the housing 99. The hydraulic chamber 96 is a hollow cylinder attached to the piston 90. Preferably, the hydraulic chamber 96 is integrally attached to the piston 90, by welding or by having the piston 90 and the chamber 96 machined from a plate. The hydraulic chamber 96 is further equipped with connections 91 for connection to an inlet hose 93 and to an outlet hose 95. The hoses, which are attached to a pump 99, supply hydraulic fluid to the hydraulic chamber 96. The pump 99 is further coupled to a controller 98. The controller 98 controls the operation of the pump 99.

Under normal conditions, the springs 94 are fully retracted. The retracted springs 94 hold the piston 90 in a position away from the pump 92. In this configuration as shown in FIG. 6 with the piston 90 pulled about one-half inches away from the pump components, the pump 92 is unable to pump fluid and to generate pressure.

When pressure is required in the pump 92, the controller 98 sends a control signal to the pump 99. In response to the signal from the controller 98, the pump 99 is turned on. The pump 99 begins to pump pressurized fluid through the hoses. As a result, the hydraulic chamber 96 is filled with pressurized fluid, creating pressure against the piston 90. The pressure from the hydraulic chamber 96, which is greater than the force applied by the springs 94 holding the piston 90 in place, forces the piston 90 to the left in FIG. 6 and into contact with the pump 92. The contact between the piston 90 and the pump 92 forms a seal, allowing the pump 92 to pump fluid and rapidly generate pressure.

To quickly stop the generation of pressure in the pump 92, the controller outputs a signal to the pump 99. In response to the signal, the pump 92 is turned off, which stops the flow of fluid in and out of the hydraulic chamber 96. Under these conditions, the pressure created by the hydraulic cylinder 96 is rapidly depleted, and the springs 94 pull the piston 90 away from the pump 92, resulting in a gap between the piston 90 and the pump 92.

FIG. 7 is an illustration of the embodiment of FIG. 3 with a ballscrew 74 used to position the piston 70 with respect to the pump 72. The ballscrew 74 translates the piston 70 by means of an attaching fork 75. The piston 70 acts as a ballscrew nut and does not rotate. A controller 76 is coupled with the ballscrew 74. Under normal operating conditions as shown in FIG. 7, a gap of ⅜ to ½ inch exists between the pump 72 and the piston 70. To move the piston 70 into contact with the pump 72, the controller 76 outputs a signal to the ballscrew 74, which begins to rotate. The rotation drives the piston 70 to the left in FIG. 7 to form a seal with the pump 72, allowing the pump 72 to generate pressure.

To rapidly stop the generation of pressure in the pump 72, the ball screw 74 rotates in an opposite direction in response to a signal from the controller 76, causing the piston 70 to move to the right in FIG. 7. As a result of the movement, the piston 70 loses contact with the pump 72.

Various embodiments of the invention have been described and illustrated. However, the description and illustrations are by way of example only. Many more embodiments and implementations are possible within the scope of this invention and will be apparent to those of ordinary skill in the art. Therefore, the invention is not limited to the specific details, representative embodiments, and illustrated examples in this description. Accordingly, the invention is not to be restricted except in light as necessitated by the accompanying claims and their equivalents.

I claim:

1. An oil pump for regulating torque in a planetary gear system, said oil pump comprising:

a pump adjacent said planetary gear system, said pump comprising an inlet port for a fluid, an outlet port for said fluid, a cover member, and an end member, wherein said end member comprises a piston;

an actuator coupled to said piston for selectively moving said piston from a first to a second position relative to said pump; and a controller coupled to said actuator, said controller responsive to control signals to control a position of said actuator.

2. The oil pump of claim 1, wherein said first position is separated from said pump by a gap, and said second position is in sealable contact with said pump.

3. The oil pump of claim 1, wherein in said second position, a fluid-tight seal is created and pressure is created in said pump.

4. The oil pump of claim 1, wherein said pump further comprises a gerotor oil pump.

5. The oil pump of claim 1, wherein said actuator further comprises a solenoid.

6. The oil pump of claim 1, wherein said actuator further comprises at least one spring set.

7. The oil pump of claim 1, wherein said actuator further comprises a ball screw.

8. The oil pump of claim 1, further comprising a housing containing said pump and said actuator.

9. The oil pump of claim 1, wherein said controller further comprises a microcomputer, said microcomputer further comprising a microprocessor, an input device, an output device, interface components, and a memory component.

10. The oil pump of claim 1, wherein said controller further comprises an automobile computer control system.

11. A system for controlling vehicle wheel torque in an automobile, said system comprising:

a planetary gear system comprising a sun gear, at least one planet gear, a planet carrier, and a ring gear;

an input shaft coupled with the planet carrier;

a pump coupled to said sun gear, said pump comprising an inlet port, an outlet port, a cover member, and an end member for selectively sealing said pump;

an actuator coupled to said end member, said actuator operative to control the position of said end member;

a controller coupled to said actuator, said controller responsive to output control signals to the actuator; and an output shaft coupled to said planetary gear system, wherein said controller signals said actuator to position said end member, sealing said pump and increasing pressure of a fluid pumped by said pump, slowing said sun gear and distributing torque via said sun gear.

12. The system of claim 11, wherein said end member further comprises a piston reciprocable between a first and a second position relative to said pump.

13. The oil pump of claim 11, wherein said first position is separated from said pump by a gap, and said second position is in sealable contact with said pump.

14. The oil pump of claim 11, wherein in said second position, a fluid-tight seal is created and pressure is created in said pump.

15. The system of claim 11, further comprising a housing containing said pump and said actuator.

16. The system of claim 11, wherein said pump further comprises a gerotor oil pump.

17. The system of claim 11, wherein said actuator further comprises a solenoid.

18. The system of claim 11, wherein said controller further comprises a microcomputer, said microcomputer comprising a microprocessor, an input device, an output device, interface components, and a memory component.

19. The system of claim 11, wherein said controller further comprises an automobile computer control system.

20. A method for regulating torque in a planetary gear system, said method comprising the steps of:

increasing pump pressure by sealing a pump with a reciprocable piston via an actuator;

transferring torque through said planetary gear system using a sun gear coupled to said pump; and controlling said torque by positioning said reciprocable piston via said actuator to regulate the pressure applied by said pump.

21. A method as claimed in claim 15, wherein said pump comprises a gerotor oil pump.

22. A method as claimed in claim 15, wherein said actuator comprises a solenoid.

* * * * *